(12) United States Patent
Lu et al.

(10) Patent No.: US 9,565,902 B2
(45) Date of Patent: Feb. 14, 2017

(54) TOE-CAP MOLDING MACHINE

(71) Applicant: TRUE TEN INDUSTRIAL CO., LTD., Taichung (TW)

(72) Inventors: Shun-Tsung Lu, Taichung (TW); Chien-Cheng Chen, Taichung (TW)

(73) Assignee: TRUE TEN INDUSTRIAL CO., LTD. (TW)

( * ) Notice: Subject to any disclaimer, the term of this patent is extended or adjusted under 35 U.S.C. 154(b) by 275 days.

(21) Appl. No.: 14/463,786

(22) Filed: Aug. 20, 2014

(65) Prior Publication Data
US 2016/0052220 A1  Feb. 25, 2016

(51) Int. Cl.
*B29D 35/12* (2010.01)
*A43D 11/12* (2006.01)
*A43B 23/08* (2006.01)
*A43D 21/12* (2006.01)

(52) U.S. Cl.
CPC ............. *A43D 11/12* (2013.01); *A43B 23/081* (2013.01); *A43D 21/12* (2013.01); *B29D 35/128* (2013.01)

(58) Field of Classification Search
CPC ........ A43D 21/12; A43D 11/12; B29D 35/128
USPC ..................... 12/64, 54.2; 425/193
See application file for complete search history.

(56) References Cited

U.S. PATENT DOCUMENTS

2015/0282568 A1* 10/2015 Chen .................. A43D 11/12
                                                                      12/64

* cited by examiner

*Primary Examiner* — Alison L Hindenlang
*Assistant Examiner* — Lawrence D Hohenbrink, Jr.
(74) *Attorney, Agent, or Firm* — Hershkovitz & Associates, PLLC; Abe Hershkovitz

(57) ABSTRACT

A toe-cap molding machine has a body, a clamping device and a shoe-tree mount. The body has a base panel, a connecting mount, a clamping cylinder and a shoe-tree cylinder. The clamping device is detachably connected to the body and has two quick-release groups and a mold group. The quick-release groups are securely mounted on the assembling panel, and each has a quick-release mount, a clamping mount and a first spring. The quick-release mount has a releasing hole, a holding pin and a mounting recess. The clamping mount is pressably connected to the quick-release mount and has an engaging block, an elongated hole and an engaging head. The mold group is connected to the quick-release groups and the assembling panel and has two guiding shaft, a limiting panel, two second springs and a clamping mold. The shoe-tree mount is detachably connected to the shoe-tree cylinder below the clamping device.

12 Claims, 6 Drawing Sheets

TOE-CAP MOLDING MACHINE

BACKGROUND OF THE INVENTION

1. Field of the Invention

The present invention relates to a toe-cap molding machine, and more particularly relates to a toe-cap molding machine that can be assembled and disassembled conveniently.

2. Description of Related Art

A conventional toe-cap molding machine has a body, a clamping device and a shoe-tree mount. The body has at least two cylinder groups. The clamping device is securely connected to the body by screws and is connected to one of the at least two cylinder groups to enable the clamping device to move relative to the body. The shoe-tree mount is securely connected to the body by fasteners and is connected to other one of the at least two cylinder groups to enable the shoe-tree mount to move relative to the body. In use, the clamping device and the shoe-tree mount can be moved to each other relative to the body by the at least two cylinder groups. Then, a material for a toe-cap of shoe that is mounted on the shoe-tree mount can be molded by the clamping device and the shoe-tree mount.

However, the conventional toe-cap molding machine can provide a molding effect to the material for the toe-cap of shoe, when the conventional toe-cap molding machine is needed to change with different sizes of the clamping devices and the shoe-tree mounts, a user needs to loosen the screws and the fasteners from the body to separate the clamping device and the shoe-tree mount from the body and this will increase the time of disassembling and assembling the different sizes of the clamping devices and the shoe-tree mounts. In addition, the screws and the fasteners may be damaged after a long time in use and this will influence the stability and the operation between the body, the clamping device and the shoe-tree mount of the conventional toe-cap molding machine.

Therefore, the present invention provides a toe-cap molding machine to mitigate or obviate the aforementioned problems.

SUMMARY OF THE INVENTION

The main objective of the present invention is to provide a toe-cap molding machine that can be assembled and disassembled conveniently.

The toe-cap molding machine in accordance with the present invention has a body, a clamping device and a shoe-tree mount. The body has a base panel, a connecting mount, a clamping cylinder and a shoe-tree cylinder. The clamping device is detachably connected to the body and has two quick-release groups and a mold group. The quick-release groups are securely mounted on the assembling panel, and each has a quick-release mount, a clamping mount and a first spring. The quick-release mount has a releasing hole, a holding pin and a mounting recess. The clamping mount is pressably connected to the quick-release mount and has an engaging block, an elongated hole and an engaging head. The mold group is connected to the quick-release groups and the assembling panel and has two guiding shaft, a limiting panel, two second springs and a clamping mold. The shoe-tree mount is detachably connected to the shoe-tree cylinder below the clamping device.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
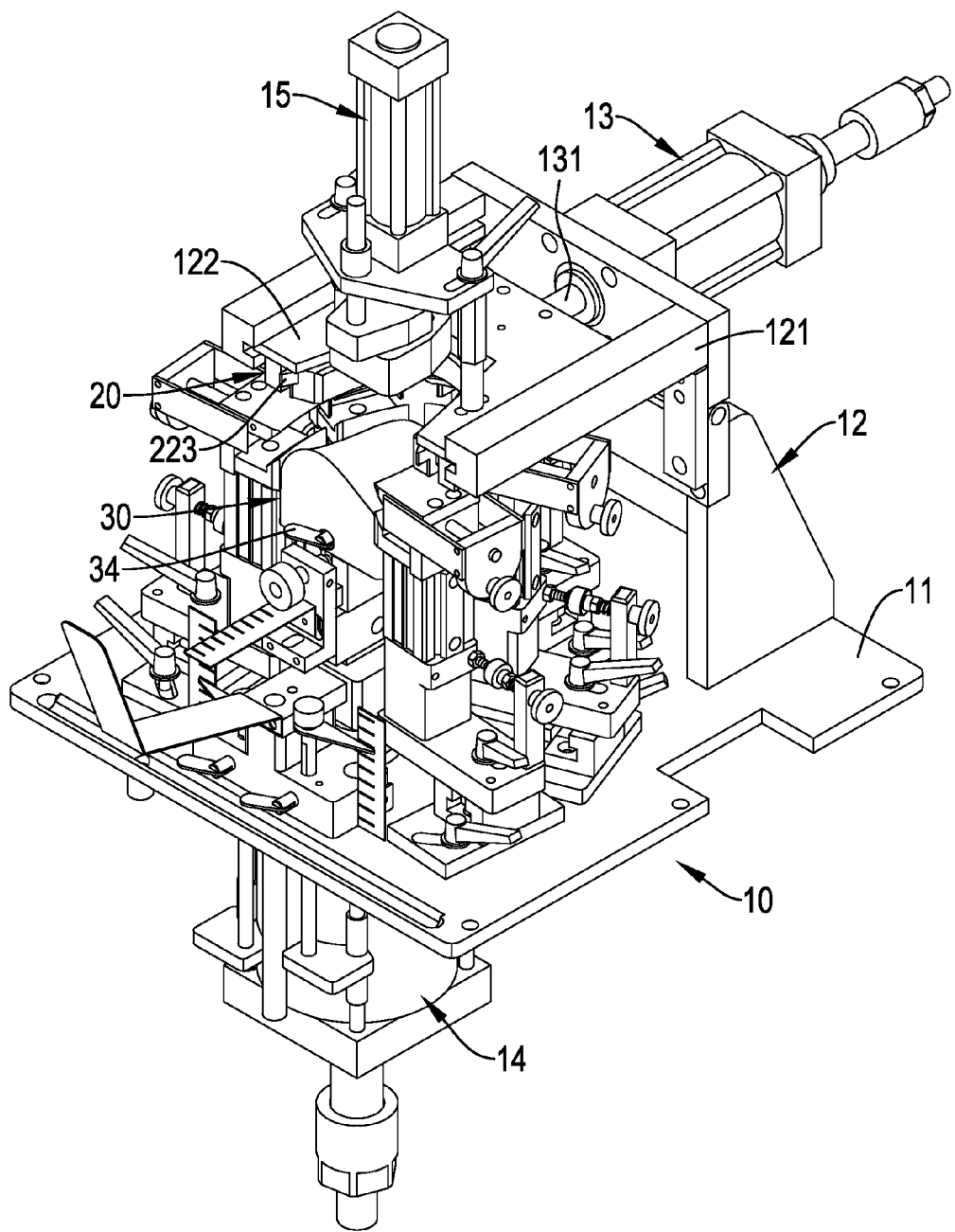
FIG. 1 is a perspective view of a toe-cap molding machine in accordance with the present invention.
Figure 2:
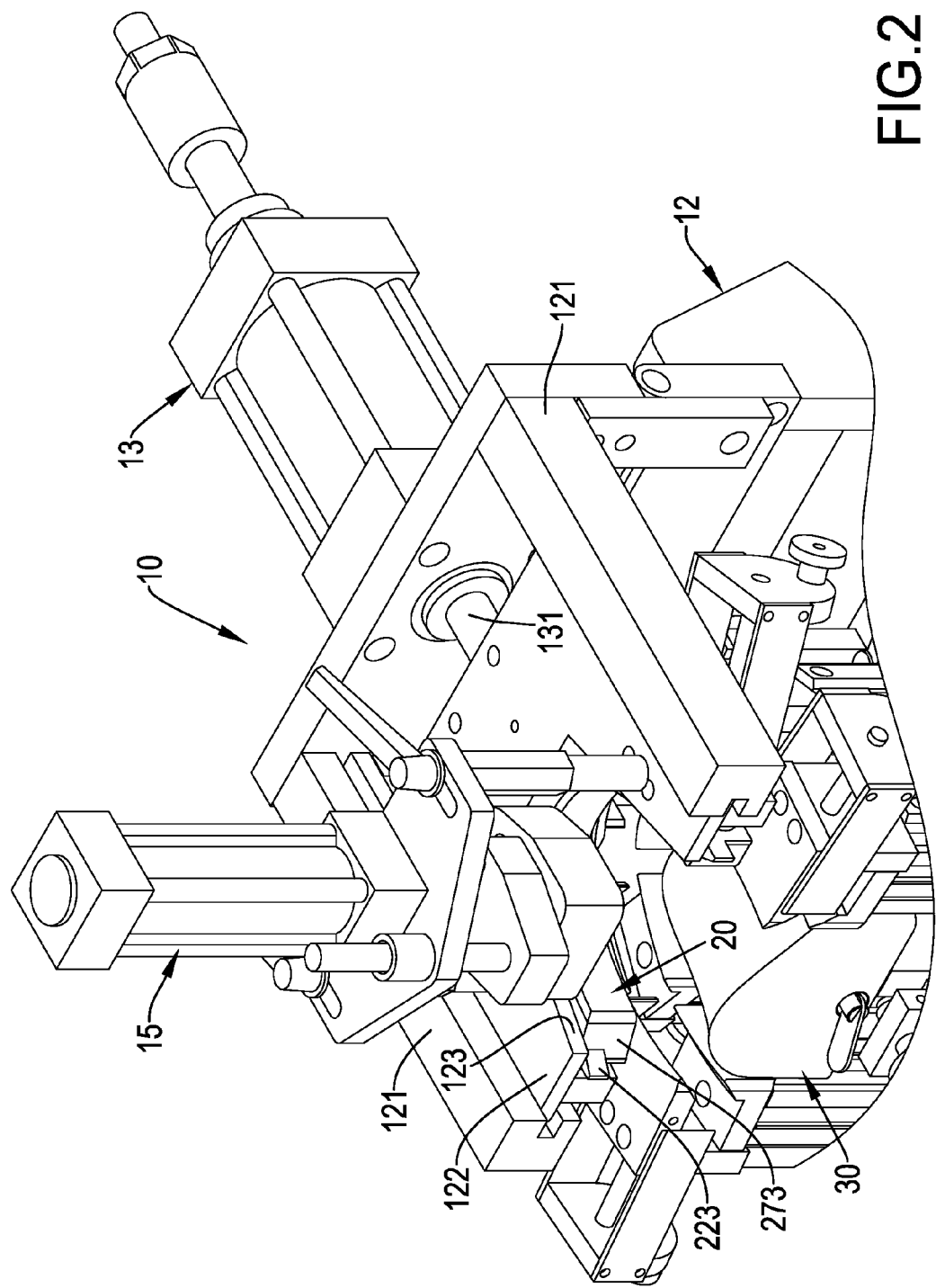
FIG. 2 is an enlarged perspective view of the toe-cap molding machine in FIG. 1.
Figure 3:
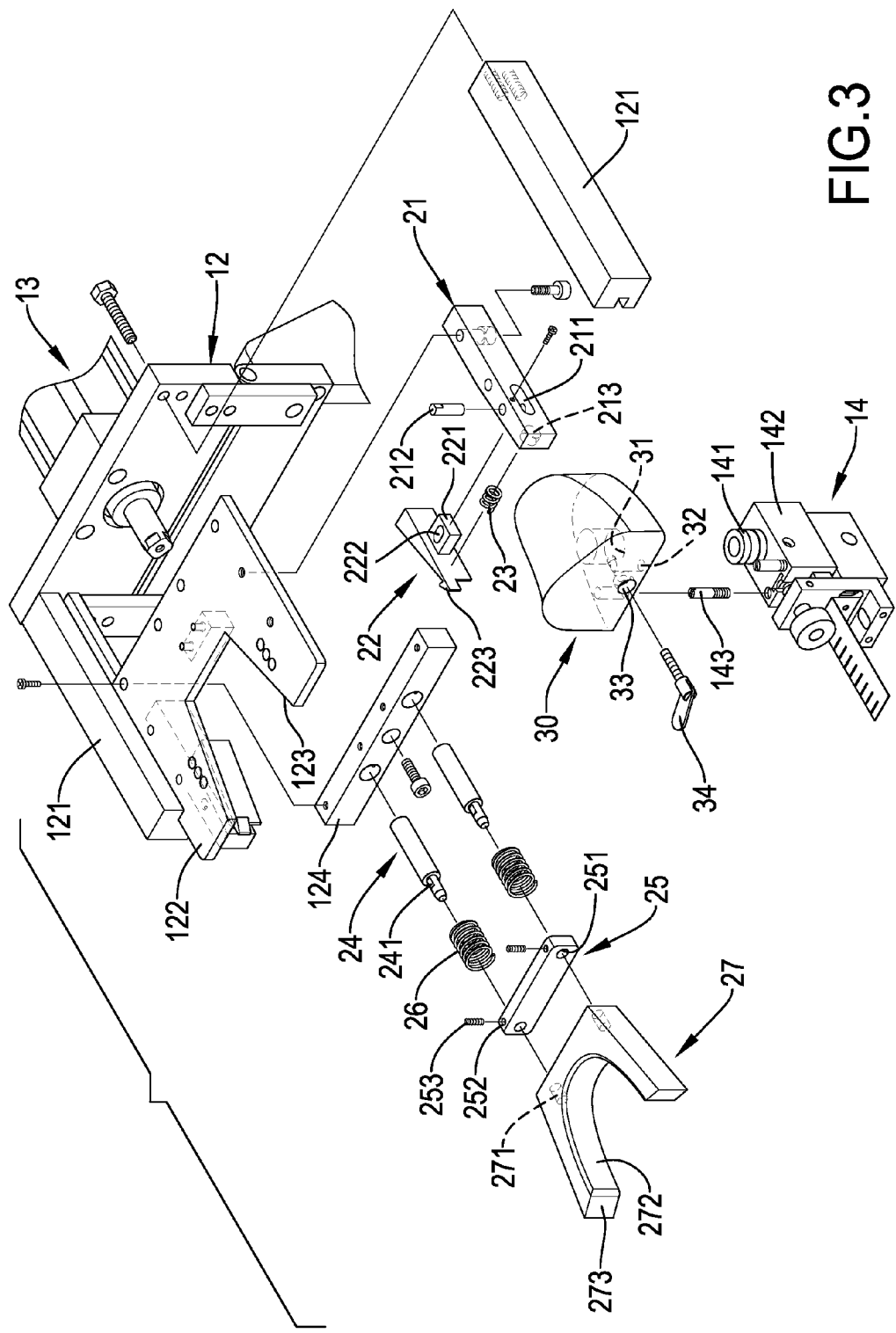
FIG. 3 is an enlarged and exploded perspective view of the toe-cap molding machine in FIG. 1.

With reference to FIGS. 1 to 3, a toe-cap molding machine in accordance with the present invention comprises a body 10, a clamping device 20 and a shoe-tree mount 30.

The body 10 has a base panel 11, a connecting mount 12 and multiple cylinders. The base panel 11 is square and has a top face, a bottom face, a rear side and a front side.

The connecting mount 12 is securely mounted on the top face of the base panel 11 near the rear side of the base panel 11 and has a top end, a front side, a rear side, two guiding rails 121, an assembling panel 122, an opening 123, a fixing bar 124 and two through holes 125. The guiding rails 121 are connected to and protrude from the front side of the connecting mount 12 at the top end of the connecting mount 12 and are parallel to each other at an interval. The assembling panel 122 is movably mounted between the guiding rails 121 and has a rear side, a front side and a bottom face.

Figure 4:
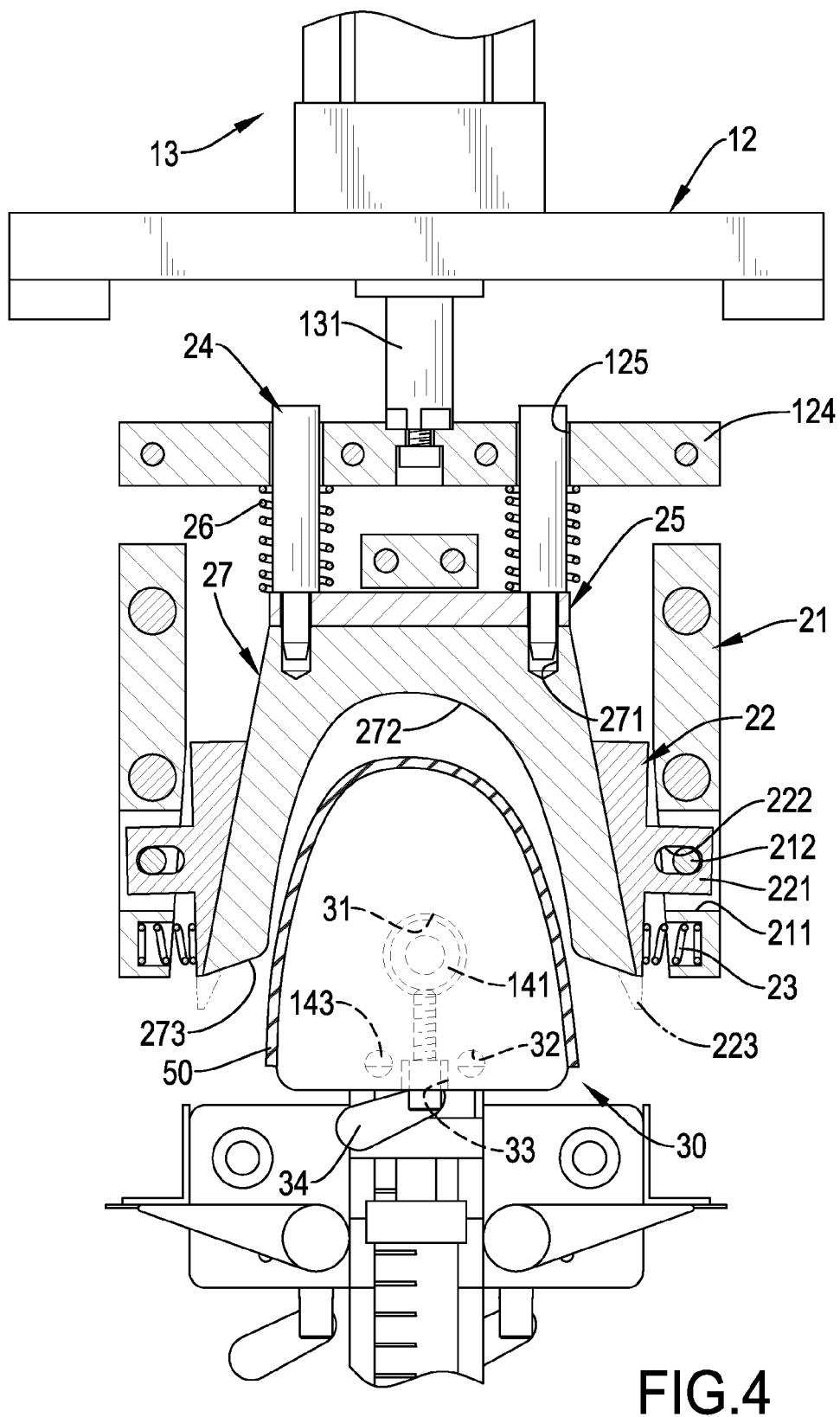
FIG. 4 is an enlarged top side view in partial section of the toe-cap molding machine in FIG. 1.

With reference to FIGS. 3 and 4, the opening 123 is U-shaped and is formed through the front side of the assembling panel 122. The fixing bar 124 is securely mounted on the bottom face of the assembling panel 122 at the rear side of the assembling panel 122 and has a middle, a front side and a rear side. The through holes 125 are formed through the front side and the rear side of the fixing bar 124 beside the middle of the fixing bar 124.

The cylinders include a clamping cylinder 13, a shoe-tree cylinder 14 and a pressing cylinder 15. The clamping cylinder 13 is securely connected to the rear side of the connecting mount 12 and has a front side and a cylinder shaft 131. The cylinder shaft 131 is movably connected to the front side of the clamping cylinder 13 and is securely connected to the middle of the fixing bar 124 between the through holes 125.

The shoe-tree cylinder 14 is securely mounted on the bottom face of the base panel 11 near the front side of the base panel 11 and has a top side, a cylinder shaft 141, a positioning block 142 and at least one locating rod 143. The cylinder shaft 141 of the shoe-tree cylinder 14 is movably connected to the top side of the shoe-tree cylinder 14, extends through the bottom face and the top face of the base panel 11 below the assembling panel 122 and has a top surface. The positioning block 142 is securely mounted on the top surface of the cylinder shaft 141 of the shoe-tree cylinder 14. The at least one locating rod 143 is securely mounted on the top surface of the cylinder shaft 141 of the shoe-tree cylinder 14 near the positioning block 142. Preferably, the shoe-tree cylinder 14 has two locating rods 143 mounted on the top surface of the cylinder shaft 141 at an interval. The pressing cylinder 15 is securely mounted on the assembling panel 122 above the shoe-tree cylinder 14.

The clamping device 20 is detachably connected to the body 10 and has two quick-release groups and a mold group.

The quick-release groups are securely mounted on the bottom face of the assembling panel 122 respectively adjacent the guiding rails 121, and each one of the quick-release groups has a quick-release mount 21, a clamping mount 22 and a first spring 23.

The quick-release mount 21 is securely mounted on the bottom face of the assembling panel 122 adjacent to one of the guiding rails 121 and has a rear end, a front end, an outer surface, an inner surface, a top side, a bottom side, a releasing hole 211, a holding pin 212 and a mounting recess 213. The rear end of the quick-release mount 21 is securely connected to the assembling panel 122. The releasing hole 211 is elongated and is transversally formed through the outer surface and the inner surface of the quick-release mount 21 near the front end of the quick-release mount 21. The holding pin 212 is longitudinally mounted in the releasing hole 211 between the top side and the bottom side of the quick-release mount 21. The mounting recess 213 is formed in the inner surface of the quick-release mount 21 at the front end of the quick-release mount 21.

The clamping mount 22 is pressably connected to the quick-release mount 21 below the assembling panel 122 and has a rear end, a front end, an outer surface, an inner surface, an engaging block 221, an elongated hole 222 and an engaging head 223. The clamping mount 22 is a wedge block and is tapered from the rear end to the front end of the clamping mount 22. The outer surface of the clamping mount 22 is a flat panel, faces the inner surface of the quick-release mount 21 and selectively abuts the inner surface of the quick-release mount 21. The inner surface of the clamping mount 22 is an inclined panel adjacent to the opening 123 of the assembling panel 122 and has an angle relative to the outer surface of the clamping mount 22.

The engaging block 221 is transversally formed on and protrudes outwardly from the outer surface of the clamping mount 22 and is movably mounted in the releasing hole 211. The elongated hole 222 is longitudinally formed thorough the engaging block 221 and is mounted around the holding pin 212 to enable the clamping mount 22 to swing relative to the quick-release mount 21. The engaging head 223 is formed on and protrudes inwardly from the inner surface of the clamping mount 22 at the front end of the clamping mount 22.

The first spring 23 is mounted in the mounting recess 213 of the quick-release mount 21 and abuts the flat face of the clamping mount 22 to form an angle between the quick-release mount 21 and the clamping mount 22.

The mold group is connected to the quick-release groups and the assembling panel 122 between the guiding rails 121 and has two guiding shaft 24, a limiting panel 25, two second springs 26 and a clamping mold 27.

The guiding shafts 24 are respectively and movably mounted through the through holes 125 of the fixing bar 124, and each one of the guiding shafts 24 has a rear end, a front end, an external surface and a guiding face 241. The rear end of the guiding shaft 24 extends out of the rear side of the fixing bar 124 via a corresponding through hole 125. The front end of the guiding shaft 24 extends out of the front side of the fixing bar 124 below the assembling panel 122. The guiding face 241 is formed in the external surface of the guiding shaft 24 near the front end of the guiding shaft 24.

The limiting panel 25 is movably connected to the guiding shafts 24 and has a front side, a rear side, a top side, two communicating holes 251, two linking holes 252 and two limiting pins 253. The communicating holes 251 are formed through the rear side and the front side of the liming panel 25 and are respectively mounted around the guiding shafts 24 to enable the front ends of the guiding shafts 24 to extend out of the front side of the limiting panel 25. When the guiding shafts 24 are mounted through the limiting panel 25, the guiding faces 241 of the guiding shafts 24 are respectively mounted in the communicating holes 251. The linking holes 252 are formed through the top side of the limiting panel 25 and respectively communicate with the communicating holes 251. The limiting pins 253 are respectively mounted in the linking holes 252, respectively extend into the communicating holes 251 and respectively abut against the guiding faces 241 of the guiding shafts 24.

The second springs 26 are respectively mounted around the guiding shafts 24 and abut the front side of the fixing bar 124 and the rear side of the limiting panel 25. The clamping mold 27 is U-shaped, is detachably connected to the quick-release groups below the assembling panel 122 and has a rear side, two free ends, an external surface, two mounting holes 271, a clamping mouth 272 and two engaging faces 273. The mounting holes 271 are formed in the rear side of the clamping mold 27 and are mounted around the front ends of the guiding shafts 24 via the limiting panel 25. The clamping mouth 272 is longitudinally formed through the clamping mold 27 below the opening 123 of the assembling panel 122. The engaging faces 273 are obliquely and respectively formed on the free ends of the clamping mount 27 and respectively engage the engaging heads 223 of the clamping mounts 22 to enable the inclined panels of the clamping mounts 22 to abut the external surface of the clamping mount 27.

The shoe-tree mount 30 is detachably connected to the shoe-tree cylinder 14 of the body 10 below the clamping device 20 and has a bottom face, a top face, a front side, a connecting recess 31, at least one positioning hole 32, a connecting hole 33 and a rotating element 34. The connecting recess 31 is formed in the bottom face of the shoe-tree mount 30 and is mounted around the cylinder shaft 141 of the shoe-tree cylinder 14. The at least one positioning hole 32 is formed in the bottom face of the shoe-tree mount 30 and is mounted around the at least one locating rod 143. Preferably, the shoe-tree mount 30 has two positioning holes 32 in the bottom face of the shoe-tree mount 30 and are respectively mounted around the locating rods 143. The connecting hole 33 is formed through the front side of the shoe-tree mount 30 and communicates with the connecting recess 31. The rotating element 34 is mounted in the connecting hole 33, extends into the connecting recess 31 and abuts against the cylinder shaft 141 of the shoe-tree cylinder 14 to hold the shoe-tree mount 30 securely on the shoe-tree cylinder 14.

Figure 5:
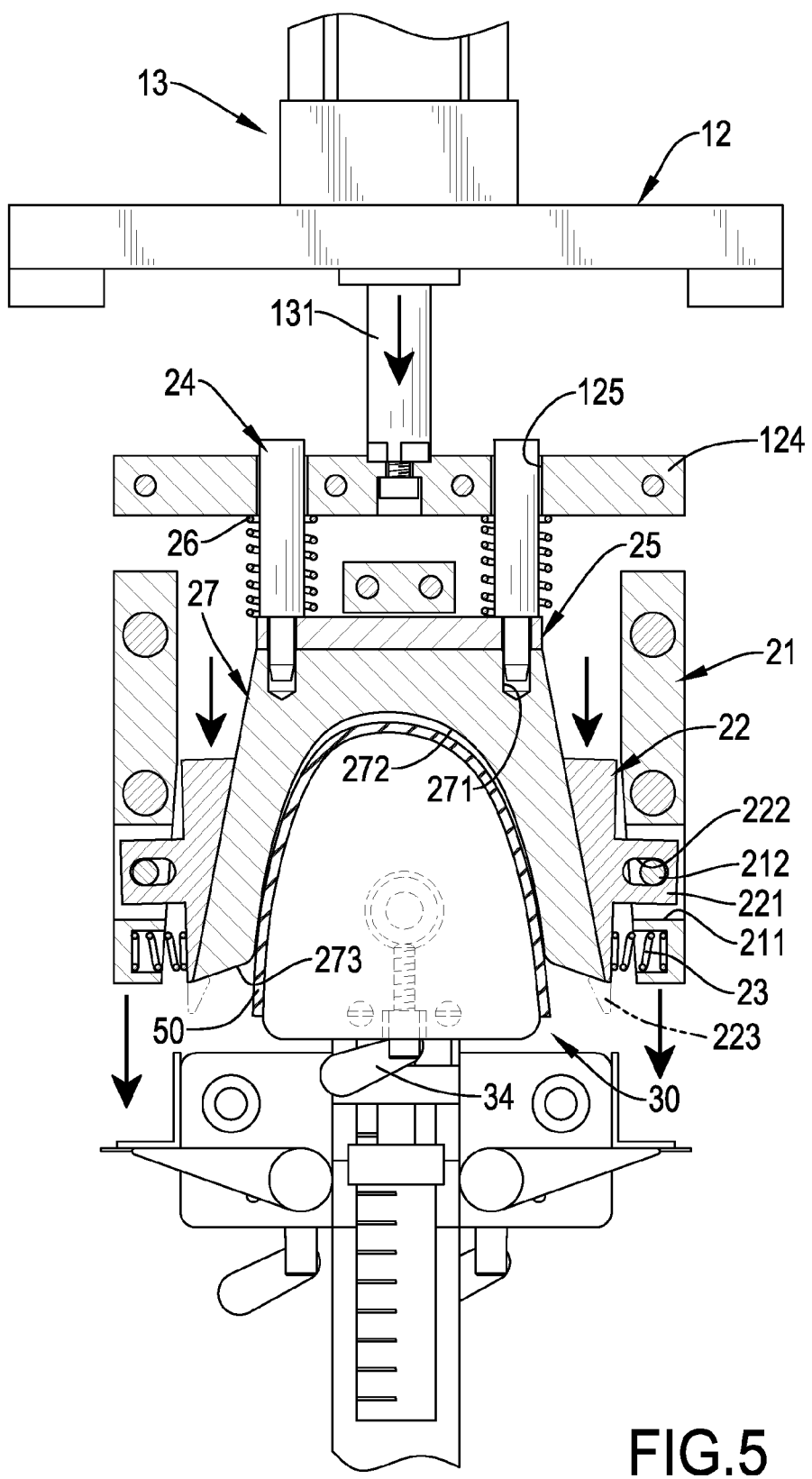
FIG. 5 is an enlarged and operational top side view in partial section of the toe-cap molding machine in FIG. 1.

In use, with reference to FIGS. 2 and 5, material for a toe-cap of shoe 50 is put on the top face of the shoe-tree mount 30, and the shoe-tree mount 30 is moved upwardly relative to the base panel 11 via the cylinder shaft 141 by the drive of the shoe-tree cylinder 14. The cylinder shaft 131 is driven by the clamping cylinder 13 to push the assembling panel 122 to move forwardly along the guiding rails 121 to move over the shoe-tree mount 30 via the fixing bar 124. The clamping mold 27 is moved with the assembling panel 122 by the clamping mold 27 holding between the guiding shafts 24 and the clamping mounts 22. Then, the clamping mold 27 can be moved over the shoe-tree mount 30 to clamp the material for a toe-cap of shoe 50. After the material for a toe-cap of shoe 50 is clamped by the clamping mold 27, the pressing cylinder 15 in driven to press the material for a toe-cap of shoe 50 to enable the material for a toe-cap of shoe 50 to form a shape corresponding to a shape of the shoe-tree mount 30.

Figure 6:
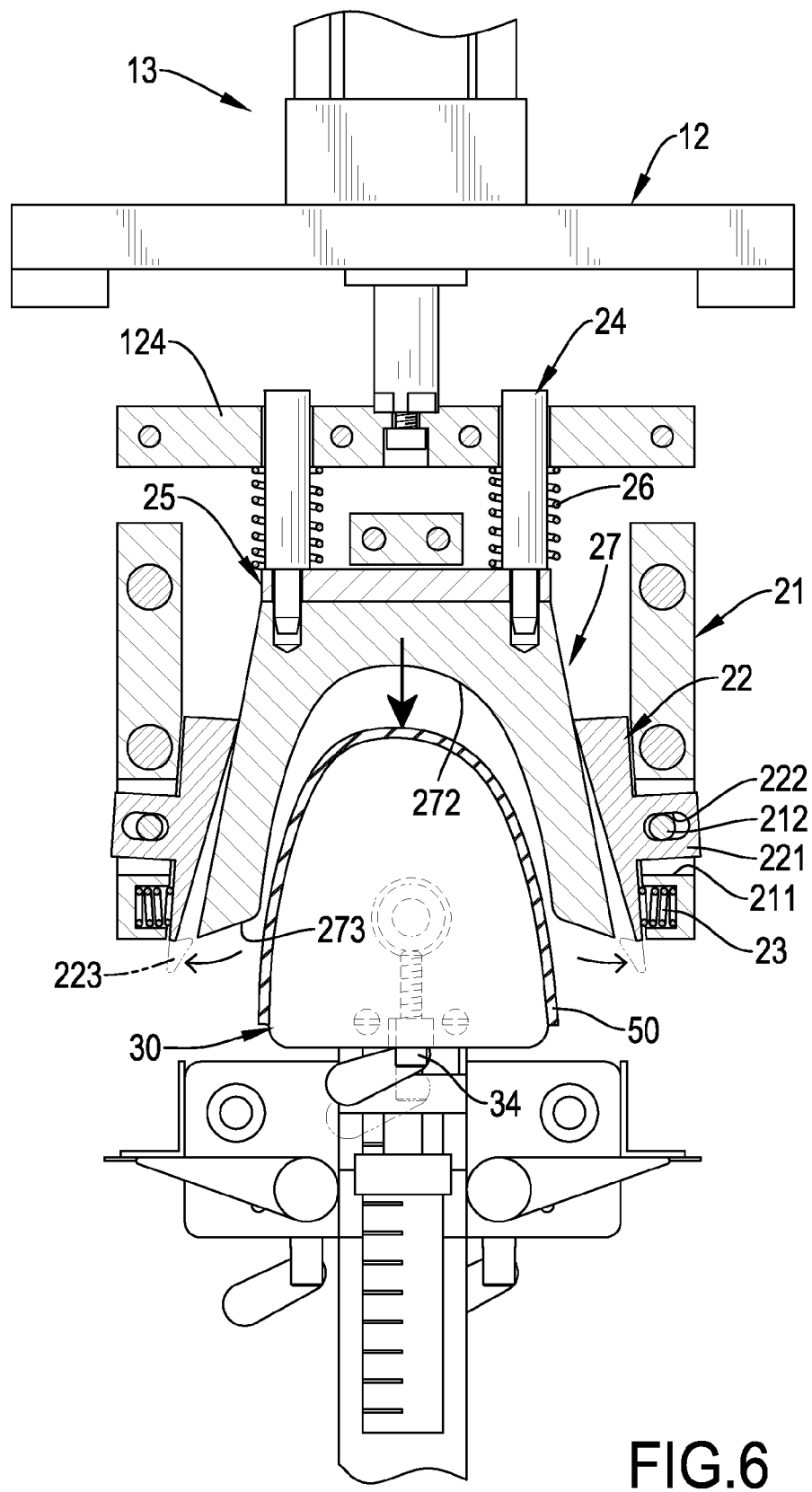
FIG. 6 is another enlarged and operational top side view in partial section of the toe-cap molding machine in FIG. 1.

With further reference to FIGS. 3 and 6, when a user wants to change different size of clamping mold 27, the user can move the engaging heads 223 of the clamping mounts 22 to move away from each other to compress the first springs 23. Then, the engaging faces 273 of the clamping mold 27 disengage from the engaging heads 223 of the clamping mounts 22 to enable the clamping mold 27 to separate from the guiding shafts 24 and the clamping mounts 24 by the second springs 26 without loosening any screws and the fasteners. In addition, when the user wants to change different size of shoe-tree mount 30, the user only needs to rotate the rotating element 34 to enable the rotating element 34 to disengaging the cylinder shaft 141 of the shoe-tree cylinder 14 and to mount a different size of shoe-tree mount 30 on the shoe-tree cylinder 14.

Therefore, in assembly, the present invention can assemble and disassemble different sizes of clamping molds 27 on the assembling panel 122 by moving the clamping mounts 22 relative to the quick-release mounts 21 and can assemble and disassemble different sizes of shoe-tree mounts 30 by rotating the rotating element 34 relative to the cylinder shaft 141 of the shoe-tree cylinder 14 conveniently.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A toe-cap molding machine comprising:
   a body having
      a base panel having a top face, a bottom face, a rear side and a front side;
      a connecting mount securely mounted on the top face of the base panel near the rear side of the base panel and having
         a top end;
         a front side;
         a rear side;
         two guiding rails connected to and protruding from the front side of the connecting mount at the top end of the connecting mount and being parallel to each other at an interval;
         an assembling panel movably mounted between the guiding rails and having a rear side, a front side and a bottom face;
         an opening formed through the front side of the assembling panel;
         a fixing bar securely mounted on the bottom face of the assembling panel at the rear side of the assembling panel and having a middle, a front side and a rear side; and
         two through holes formed through the front side and the rear side of the fixing bar beside the middle of the fixing bar;
      a clamping cylinder securely connected to the rear side of the connecting mount and having a front side and a cylinder shaft movably connected to the front side of the clamping cylinder and securely connected to the middle of the fixing bar between the through holes; and
      a shoe-tree cylinder securely mounted on the bottom face of the base panel near the front side of the base panel;
   a clamping device detachably connected to the body and having
      two quick-release groups securely mounted on the bottom face of the assembling panel respectively adjacent the guiding rails, and each one of the quick-release groups having
         a quick-release mount securely mounted on the bottom face of the assembling panel adjacent to one of the guiding rails and having
            a rear end securely connected to the assembling panel;
            a front end;
            an outer surface;
            an inner surface;
            a top side;
            a bottom side;
            a releasing hole being elongated and transversally formed through the outer surface and the inner surface of the quick-release mount near the front end of the quick-release mount;
            a holding pin longitudinally mounted in the releasing hole between the top side and the bottom side of the quick-release mount; and
            a mounting recess formed in the inner surface of the quick-release mount at the front end of the quick-release mount;
         a clamping mount pressably connected to the quick-release mount below the assembling panel and having
            a rear end;
            a front end;
            an outer surface being a flat panel, facing the inner surface of the quick-release mount and selectively abutting the inner surface of the quick-release mount;
            an inner surface being an inclined panel adjacent to the opening of the assembling panel and having an angle relative to the outer surface of the clamping mount;
            an engaging block transversally formed on and protruding outwardly from the outer surface of the clamping mount and movably mounted in the releasing hole;
            an elongated hole longitudinally formed thorough the engaging block and mounted around the holding pin to enable the clamping mount to swing relative to the quick-release mount; and
            an engaging head formed on and protruding inwardly from the inner surface of the clamping mount at the front end of the clamping mount; and
         a first spring mounted in the mounting recess of the quick-release mount and abutting the flat face of the clamping mount to form an angle between the quick-release mount and the clamping mount; and
      a mold group connected to the quick-release groups and the assembling panel between the guiding rails and having two guiding shafts respectively and movably mounted through the through holes of the fixing bar, and each one of the guiding shafts having
a rear end of the guiding shaft extending out of the rear side of the fixing bar via a corresponding through hole; and
a front end of the guiding shaft extending out of the front side of the fixing bar below the assembling panel;
a limiting panel movably connected to the guiding shafts and having a front side, a rear side, a top side and two communicating holes formed through the rear side and the front side of the liming panel and respectively mounted around the guiding shafts to enable the front ends of the guiding shafts to extend out of the front side of the limiting panel;
two second springs respectively mounted around the guiding shafts and abutting the front side of the fixing bar and the rear side of the limiting panel; and
a clamping mold detachably connected to the quick-release groups below the assembling panel and having
a rear side;
two free ends;
an external surface;
two mounting holes formed in the rear side of the clamping mold and mounted around the front ends of the guiding shafts via the limiting panel;
a clamping mouth longitudinally formed through the clamping mold below the opening of the assembling panel; and
two engaging faces obliquely and respectively formed on the free ends of the clamping mold and respectively engaging the engaging heads of the clamping mounts to enable the inclined panels of the clamping mounts to abut the external surface of the clamping mold; and
a shoe-tree mount detachably connected to the shoe-tree cylinder of the body below the clamping device.

2. The toe-cap molding machine as claimed in claim 1, wherein
each one of the guiding shafts has
an external surface; and
a guiding face formed in the external surface of the guiding shaft near the front end of the guiding shaft and mounted in a corresponding communicating hole when the guiding shaft is mounted through the limiting panel via the corresponding hole;
the limiting panel has
two linking holes formed through the top side of the limiting panel and respectively communicating with the communicating holes; and
two limiting pins respectively mounted in the linking holes, respectively extending into the communicating holes and respectively abutting against the guiding faces of the guiding shafts.

3. The toe-cap molding machine as claimed in claim 1, wherein
the shoe-tree cylinder has
a top side; and
a cylinder shaft movably connected to the top side of the shoe-tree cylinder, extending through the bottom face and the top face of the base panel below the assembling panel and having a top surface; and
the shoe-tree mount has
a bottom face;
a top face;
a front side;
a connecting recess formed in the bottom face of the shoe-tree mount and mounted around the cylinder shaft of the shoe-tree cylinder;
a connecting hole formed through the front side of the shoe-tree mount and communicating with the connecting recess; and
a rotating element mounted in the connecting hole, extending into the connecting recess and abutting against the cylinder shaft of the shoe-tree cylinder to hold the shoe-tree mount securely on the shoe-tree cylinder.

4. The toe-cap molding machine as claimed in claim 2, wherein
the shoe-tree cylinder has
a top side; and
a cylinder shaft movably connected to the top side of the shoe-tree cylinder, extending through the bottom face and the top face of the base panel below the assembling panel and having a top surface; and
the shoe-tree mount has
a bottom face;
a top face;
a front side;
a connecting recess formed in the bottom face of the shoe-tree mount and mounted around the cylinder shaft of the shoe-tree cylinder;
a connecting hole formed through the front side of the shoe-tree mount and communicating with the connecting recess; and
a rotating element mounted in the connecting hole, extending into the connecting recess and abutting against the cylinder shaft of the shoe-tree cylinder to hold the shoe-tree mount securely on the shoe-tree cylinder.

5. The toe-cap molding machine as claimed in claim 3, wherein
the shoe-tree cylinder has
a positioning block securely mounted on the top surface of the cylinder shaft of the shoe-tree cylinder; and
at least one locating rod securely mounted on the top surface of the cylinder shaft of the shoe-tree cylinder near the positioning block; and
the shoe-tree mount has at least one positioning hole formed in the bottom face of the shoe-tree mount and mounted around the at least one locating rod.

6. The toe-cap molding machine as claimed in claim 4, wherein
the shoe-tree cylinder has
a positioning block securely mounted on the top surface of the cylinder shaft of the shoe-tree cylinder; and
at least one locating rod securely mounted on the top surface of the cylinder shaft of the shoe-tree cylinder near the positioning block; and
the shoe-tree mount has at least one positioning hole formed in the bottom face of the shoe-tree mount and mounted around the at least one locating rod.

7. The toe-cap molding machine as claimed in claim 5, wherein
the shoe-tree cylinder has two locating rods mounted on the top surface of the cylinder shaft at an interval; and
the shoe-tree mount has two positioning holes in the bottom face of the shoe-tree mount and respectively mounted around the locating rods of the shoe-tree cylinder.

8. The toe-cap molding machine as claimed in claim 6, wherein
- the shoe-tree cylinder has two locating rods mounted on the top surface of the cylinder shaft at an interval; and
- the shoe-tree mount has two positioning holes in the bottom face of the shoe-tree mount and respectively mounted around the locating rods of the shoe-tree cylinder.

9. The toe-cap molding machine as claimed in claim 7, wherein the body has a pressing cylinder securely mounted on the assembling panel above the shoe-tree cylinder.

10. The toe-cap molding machine as claimed in claim 8, wherein the body has a pressing cylinder securely mounted on the assembling panel above the shoe-tree cylinder.

11. The toe-cap molding machine as claimed in claim 1, wherein the body has a pressing cylinder securely mounted on the assembling panel above the shoe-tree cylinder.

12. The toe-cap molding machine as claimed in claim 2, wherein the body has a pressing cylinder securely mounted on the assembling panel above the shoe-tree cylinder.

* * * * *